United States Patent

Shilliday

[15] 3,650,031
[45] Mar. 21, 1972

[54] MANDIBULAR DENTAL CAST AND METHOD OF MAKING SAME

[72] Inventor: Douglas J. Shilliday, 1501 London Drive, Upper Arlington, Ohio 43221

[22] Filed: July 7, 1970

[21] Appl. No.: 52,864

[52] U.S. Cl. ............................................................. 32/1
[51] Int. Cl. ..................................................... A61c 19/00
[58] Field of Search ................... 32/2, 17, 32; 264/16, 17, 18; 18/5.7

[56] References Cited

UNITED STATES PATENTS 3,360,860   1/1968   Roland ................................... 32/17
2,310,912   2/1943   Mintz ................................. 32/17 X

*Primary Examiner*—Robert Peshock
*Attorney*—William S. Rambo

[57] ABSTRACT

A mandibular dental cast in which a substantially rigid, filler plate or matrix is embedded to fill and smooth the central void or tongue space area of a mandibular arch casting formed in a dental impression mold; the filler plate or matrix being of generally parabolic outline and being at least partially embedded in the plaster or plastic casting as it is being formed in the impression mold.

5 Claims, 9 Drawing Figures

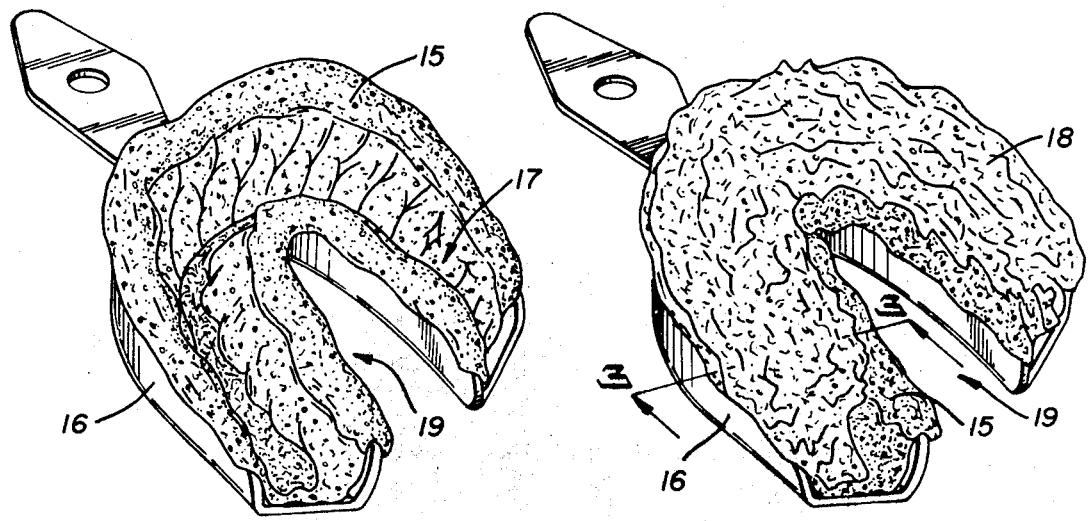
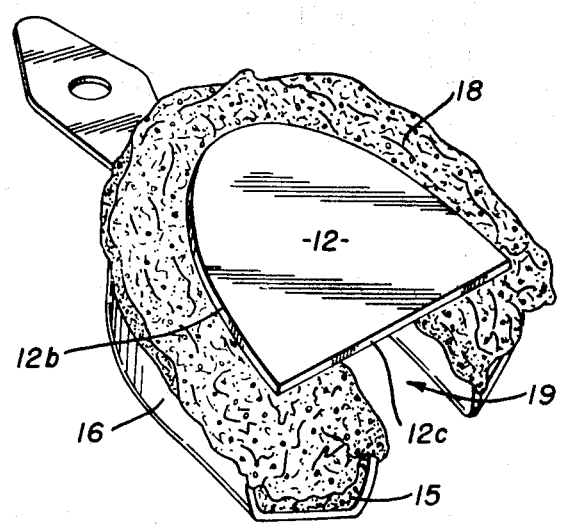
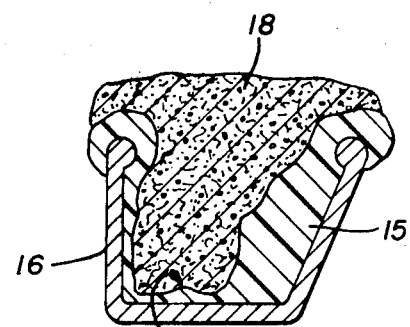
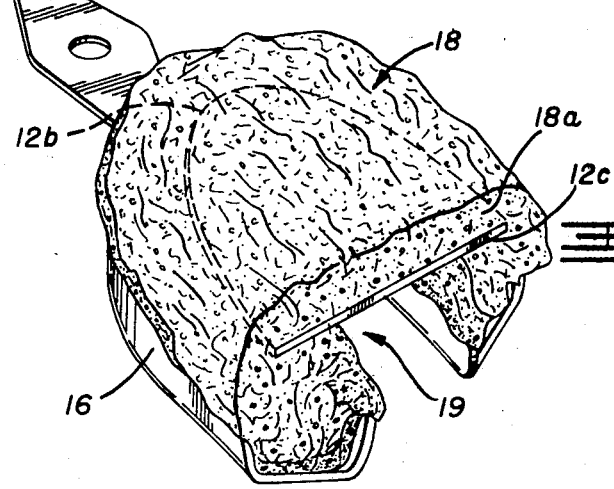

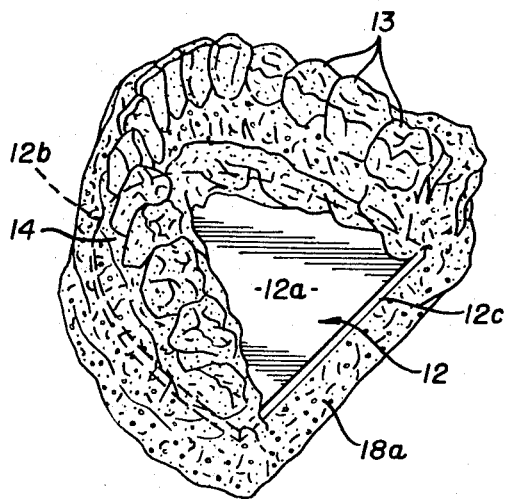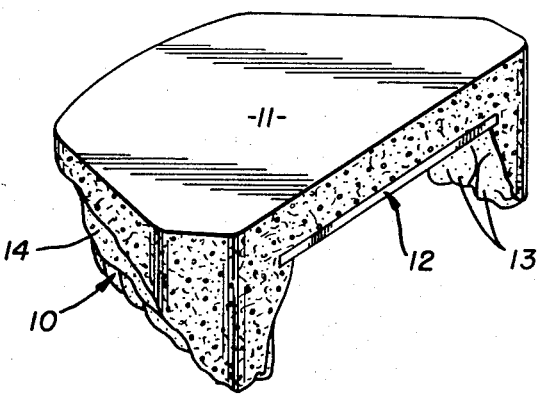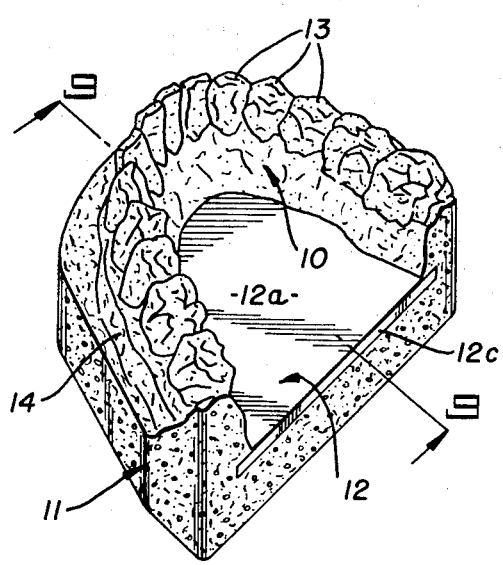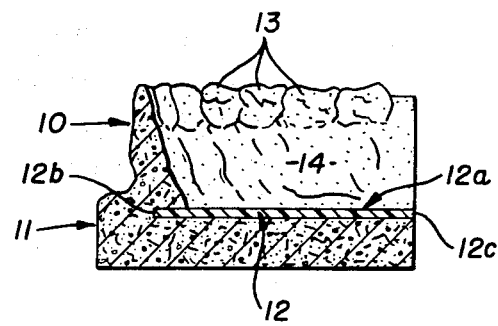

MANDIBULAR DENTAL CAST AND METHOD OF MAKING SAME

BACKGROUND OF THE INVENTION

The present invention relates generally to the art or science of making dental models or plaster casts of teeth, and more particularly to an improved mandibular dental cast and a method of fabricating the same and to a novel filler or matrix for embedment in such casts.

In the past, dental models or casts have been generally made by first forming an impression mold having a cavity conforming in shape and size to a human dental arch (either maxillary or mandibular), then overfilling the cavity of the impression mold with plaster of Paris or gypsum in a semi-liquid, plastic state to form a casting composed of a dental arch portion conforming to the cavity of the mold and an integral, relatively thick base or block portion which is built up by hand modeling or trowelling the overflow of plaster and later machining or grinding the outer surfaces to smoothness and desired size to fit within an articulator or other support. While the aforementioned prior art method or process is satisfactory for the making of maxillary casts or models, considerable difficulty is usually encountered when using such methods in the formation of mandibular casts due to the presence of the central tongue space or void present in the mandibular impression mold. In an attempt to close the tongue space or central void present in the mandibular impression mold, the dentist or dental technician oftentimes applies an extra layer or web of formable mold material to the lingual areas of the impression mold to bridge the tongue space and thereby form a supporting matrix for the overflow or built-up plaster used to form the supporting base or block portion of the finished cast or model. In other instances, the technician may form a temporary matrix from wadded-up paper positioned within the tongue space or central void of the impression mold prior to the over-filling of the mold cavity with plaster and utilize the paper matrix as a temporary bridge support for the base or block portion of the casting. All in all, the filling or bridging of the tongue space or central void of the impression mold represents a laborious and time-consuming hand operation for the dentist or technician.

SUMMARY AND OBJECTS OF THE INVENTION

The principal object of this invention is to minimize, if not eliminate, the difficulties heretofore encountered in the making of mandibular dental arch models or casts by providing an improved construction for such casts and a simplified, easily performed method or technic for making the same.

According to the present invention, a relatively flat, preformed, rigid plaster or plastic filler plate or matrix is embedded in the overflow portion of plaster during the casting operation to provide a strong and rigid support for the built-up and superposed base portion of the plaster cast. The plaster cast is caused to set and harden around the embedded matrix plate while in the impression mold and is then removed from the mold and the exterior surfaces of the supporting base or block portion of the casting is ground or machined to desired dimensions and smoothness. The embedded matrix or filler plate may also be arranged to provide a smooth and neat-appearing floor surface for the lingual area of the finished mandibular cast.

BRIEF DESCRIPTION OF THE DRAWINGS

For a further and more detailed understanding of this invention and the various additional objects and advantages attendant thereto, reference is made to the following description and the accompanying drawings, wherein:

FIG. 1 is a perspective view of an impression mold and its supporting tray and illustrating the first step of the present method;

FIG. 2 is a similar view showing the cavity of the impression mold being overfilled with plaster;

FIG. 3 is an enlarged, detailed vertical sectional view taken along the line 3—3 of FIG. 2;

FIG. 4 is a perspective view showing the matrix plate being applied to the wet plaster;

FIG. 5 is a similar view showing a build-up of plaster around and over the matrix plate;

FIG. 6 is a perspective view of the unfinished cast removed from the mold;

FIG. 7 is a perspective view of the finished cast in inverted position;

FIG. 8 is a similar view showing the finished cast in its usual upright position; and FIG. 9 is a vertical sectional view taken along the line 9—9 of FIG. 8.

DETAILED DESCRIPTION OF PREFERRED EMBODIMENT

Referring now to the drawings, FIGS. 7–9 illustrate a finished, mandibular dental model or cast according to this invention. The model or cast comprises a unitary, rigid plaster or plastic structure consisting of an outwardly projecting, mandibular arch portion, generally indicated by the reference numeral 10, a relatively enlarged, supporting base or block portion 11, and a partially embedded, relatively flat filler or matrix plate 12. In the usual manner, the dental arch portion 10 of the casting or model includes a set of teeth 13 and adjacent gingival surfaces 14 which are substantially an exact replica of the corresponding portions of a human mandibular arch. Preferably, the exterior surfaces of the supporting base or block portion 11 are ground or otherwise machined to desired dimensions and smoothness in accordance with standardized technics so as to properly fit within a suitable display support or articulator, not shown.

As will be noted, the intermediate filler or matrix plate 12 is preferably arranged within the cast so as to form and define a generally planar, smooth floor surface 12a for the mandibular arch portion 10 of the casting. Toward this end, the matrix plate 12 is preferably of molded, rigid synthetic resin composition, such as polyvinyl chloride, although it may be composed of plaster of Paris or gypsum. In any event, the matrix plate 12 is preformed to its desired rigid and solid shape prior to the embedment thereof within the casting, as will be hereinafter more fully explained. The plate 12 consists of a relatively thin, flat tongue-shaped body having opposite, planar side surfaces and a generally parabolic, leading marginal edge 12b and a straight base or rear edge 12c. Advantageously, the matrix plate 12 may be pigmented or colored to match or harmonize with the color of the remaining portion of the casting or model.

FIGS. 1–6 illustrate sequentially the essential steps involved in the fabrication or making of a mandibular cast according to this invention. First, an impression mold 15 of relatively soft, pliable mold material, such as an alginate, or other well-known dental mold composition, is formed in the usual manner by placing a formable mass of the mold material in a generally U-shaped, metal impression tray 16 and then pressing the tray-supported mass of mold material over the patient's lower teeth to form an impressed mold cavity 17 in the mold material. As will be understood, the resultant cavity 17 is a negative impression of the mandibular arch of the person from whom it is taken.

Next, as shown in FIGS. 2 and 3, the cavity 17 of the impression mold 15 is slightly overfilled with a flowable mass 18 of wet plaster of Paris or gypsum. The impression tray 16 and its contents are then subjected to vibration forces to cause the mass 18 of wet plaster to completely fill and be compacted in the mold cavity 17. At the same time, occluded air bubbles are exhausted from the mass of plaster to eliminate undesired voids therein.

While the plaster is still in a wet and formative state, the marginal edge portion of the preformed matrix plate 12 is placed upon and gently pressed into the overflow portion of the mass 18 of plaster, as shown in FIG. 4. The matrix plate 12 may be adjusted on the plaster mass 18 so that it spans and overlies the central void or opening 19 of the impression mold and the cast mass 18 of plaster, with the rearward edge 12c of the plate spaced slightly inwardly from the outer ends of the impression tray 16.

Next, as illustrated in FIG. 5, the upper and marginal edge surfaces of the matrix plate 12 are covered over with an additional layer or mass 18a of wet plaster. This is accomplished by simply pouring and trowelling an additional quantity of wet plaster over the plate 12 and the contiguous surfaces of the initial mass 18 of plaster to cause the added mass of plaster to cohere with the mass 18 and completely cover the upper surface of the plate 12. The added mass 18a of plaster is sufficient to form the relatively enlarged and thickened base area of the casting. The wet plaster is then allowed to set and dry while remaining in the impression mold 15 and tray 16. When the plaster casting has set to a dry and hard condition, the rough casting (see FIG. 6) is removed from the impression mold 15. The exterior surfaces of the plaster cast in the base region thereof are then ground to desired dimensions and shape to produce the desired finished cast or model as shown in FIGS. 7–9.

In view of the foregoing it will be seen that the present invention provides an improved mandibular dental cast and method of making such a cast through the use of a preformed matrix plate which is embedded in the plastic cast material to facilitate the build-up of the supporting base of the cast and to strengthen and finish the otherwise void portion of the usual mandibular cast.

While a single preferred example of the practice of the present invention has been illustrated and described in detail, it will be understood that various modifications as to details of construction and design may be resorted to without departing from the spirit of the invention or the scope of the following claims.

I claim:

1. The method of making a mandibular dental cast which comprises:
   1. making an arch-shaped impression mold having a cavity conforming in size and shape to a human mandibular arch;
   2. overfilling the cavity of said mold with a hardenable plastic material to form a generally U-shaped cast having a central void and an overfill portion extending above the cavity of said mold;
   3. placing over the central void of said cast a preformed, rigid matrix plate and permanently embedding certain portions of said plate in the overfill portion of said plastic material;
   4. causing said plastic material to harden within said mold and around said plate; and thereafter
   5. removing said cast with the plate embedded therein from said mold and finishing the exterior surfaces of the overfill portion of said cast.

2. The method defined in claim 1, wherein said matrix plate is composed of a rigid plastic material.

3. The method defined in claim 2, wherein said matrix plate is of generally parabolic outline.

4. A mandibular dental cast comprising a unitary body of hardened plastic composition defining a mandibular dental arch portion projecting outwardly from a relatively enlarged base portion; and a preformed, relatively thin, flat matrix plate at least partially embedded and permanently secured within said body and defining a generally planar floor surface for the dental arch portion of said body.

5. A mandibular dental cast as defined in claim 4, wherein said matrix plate has a generally parabolic marginal edge and is composed of a rigid plastic material.

* * * * *